(12) United States Patent
Jourdan et al.

(10) Patent No.: US 8,291,196 B2
(45) Date of Patent: Oct. 16, 2012

(54) FORWARD-PASS DEAD INSTRUCTION IDENTIFICATION AND REMOVAL AT RUN-TIME

(75) Inventors: Stephan J. Jourdan, Portland, OR (US); Matthew C. Merten, Hillsboro, OR (US); Alexandre J. Farcy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 29 days.

(21) Appl. No.: 11/323,037

(22) Filed: Dec. 29, 2005

(65) Prior Publication Data

US 2007/0157007 A1 Jul. 5, 2007

(51) Int. Cl.
*G06F 9/00* (2006.01)
(52) U.S. Cl. ........................ 712/216; 712/220
(58) Field of Classification Search .................. 717/151, 717/153, 154, 155, 156, 158, 159; 712/216
See application file for complete search history.

(56) References Cited

U.S. PATENT DOCUMENTS

| | | | | |
|---|---|---|---|---|
| 5,313,614 A * | 5/1994 | Goettelmann et al. | ........ | 717/138 |
| 5,966,539 A * | 10/1999 | Srivastava | ...................... | 717/156 |
| 6,857,060 B2 * | 2/2005 | Elias et al. | ..................... | 712/217 |
| 2002/0013938 A1 * | 1/2002 | Duesterwald et al. | ............ | 717/9 |
| 2004/0221280 A1 * | 11/2004 | Bolton et al. | .................. | 717/151 |
| 2005/0166194 A1 * | 7/2005 | Rubin et al. | ................... | 717/151 |

OTHER PUBLICATIONS

Sundaramoorthy et al., "Slipstream Processors: Improving Both Performance and Fault Tolerance," Nov. 2000, pp. 257-268.*
Martin et al., "Exploiting Dead Value Information", IEEE, Dec. 1-3, 1997, pp. 125-135.*
Probst et al., "Register Liveness Analysis for Optimizing Dynamic Binary Translation", Oct. 29-Nov. 1, 2002, pp. 35-44.*

* cited by examiner

*Primary Examiner* — David Huisman
(74) *Attorney, Agent, or Firm* — Thomas R. Lane (57) ABSTRACT

Apparatuses and methods for dead instruction identification are disclosed. In one embodiment, an apparatus includes an instruction buffer and a dead instruction identifier. The instruction buffer is to store an instruction stream having a single entry point and a single exit point. The dead instruction identifier is to identify dead instructions based on a forward pass through the instruction stream.

12 Claims, 11 Drawing Sheets

| | Op 204 ID | Op 203 ID | Op 205 ID | |
|---|---|---|---|---|
| | | Destination Table 140 | | |

| | | | | | | |
|---|---|---|---|---|---|---|
| 151 | 1 | | | | | |
| 152 | 0 | 1 | | | | |
| 153 | 0 | 1 | 1 | | | |
| 154 | 1 | 1 | 0 | 1 | | |
| 155 | 0 | 0 | 0 | 0 | 1 | |
| 156 | | | | | | |
| 160 | | | | | | |

Producer Table 150

Dead Instruction Identifier 130

FORWARD-PASS DEAD INSTRUCTION IDENTIFICATION AND REMOVAL AT RUN-TIME

BACKGROUND

1. Field

The present disclosure pertains to the field of information processing, and, more specifically, to the field of optimizing program code.

2. Description of Related Art

The performance of an information processing system may be improved by optimizing the program code that runs on the system. One technique for optimizing program code is to eliminate instructions that are not necessary for correct program execution. For example, program code may be optimized by identifying and eliminating "dead" instructions. A dead instruction is a producer or other instruction that does not produce data used by a consumer, where a producer is an instruction that produces data and a consumer is an instruction that uses data.

Dead instructions may be found in a sequence or stream of instructions within a program that is always executed in its entirety, with no branch or other execution path into the instruction stream after the first instruction or out of the instruction stream before the last instruction. In other words, the instruction stream has a single entry point, at the beginning, and a single exit point, at the end. Producers in such an instruction stream may produce data that is stored for use by consumers either inside or outside the stream. Any instruction that does not produce data that is available for use by instructions outside the stream, or does not produce data that is used, directly or indirectly, to produce data that is available for use outside the stream is a dead instruction. An example of a dead instruction is an instruction that writes data to a register or other storage location, but before the data is used by another instruction, the register or other storage location is overwritten by another instruction inside the stream.

Typically, dead instructions are identified by analyzing an instruction stream in reverse order of execution. A register or other storage element that has been written to by a producer inside the stream and is readable by a consumer outside the stream after execution of the stream is referred to as a "live-out" register. The last producer to write data to a live-out register is not a dead instruction, because it is assumed that there is a consumer of the data outside the stream. If any such last producer is also a consumer of any prior producer inside the stream, then each such prior producer is also not a dead instruction. If each such prior producer is also a consumer of any other prior producer inside the stream, then each such other prior producer is also not a dead instruction, and so on. Therefore, an instruction stream may be analyzed in reverse to first identify whether an instruction is a last producer, then to identify whether an instruction is a producer of data for a last producer, and so on. After such a complete backward pass, any leftover instructions may then be identified as dead instructions.

BRIEF DESCRIPTION OF THE FIGURES

The present invention is illustrated by way of example and not limitation in the accompanying figures.

DETAILED DESCRIPTION

The following description describes embodiments of techniques for forward-pass dead instruction identification. In the following description, numerous specific details such as processor and system configurations are set forth in order to provide a more thorough understanding of the present invention. It will be appreciated, however, by one skilled in the art that the invention may be practiced without such specific details. Additionally, some well known structures, circuits, and the like have not been shown in detail, to avoid unnecessarily obscuring the present invention.

Embodiments of the present invention provide for the identification of dead instructions using a forward pass through an instruction stream, which may be desirable because the forward pass may be the same forward pass during which the instruction stream is initially loaded into an instruction cache and/or executed. The instructions identified as dead instructions may then be removed from the instruction stream by not copying them into, or back into, an instruction cache or buffer from which instructions are read for execution in any subsequent executions of the same instruction stream. Therefore, instruction streams that are executed more than once may be optimized without requiring any extra passes for optimization.

Any program may be optimized according to embodiments of the present invention by breaking the programs into sequences of instruction streams, each with a single entry point and a single exit point.

Figure 1:
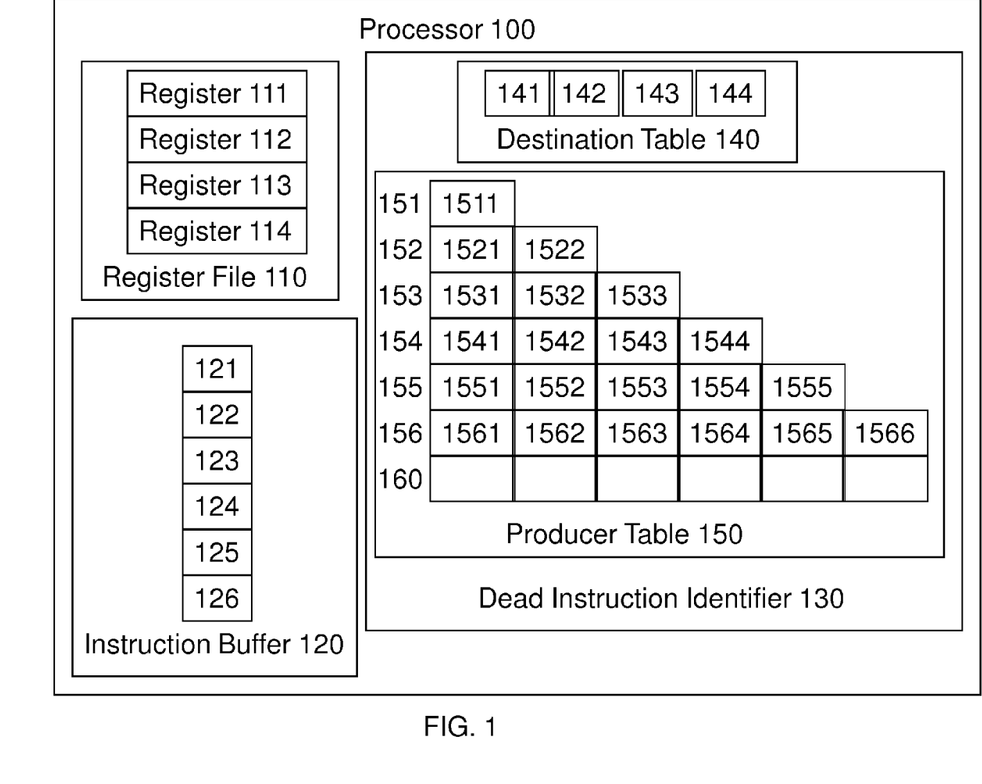
FIG. 1 illustrates an embodiment of the invention in a processor including logic for forward-pass identification of dead instructions.

FIG. 1 illustrates an embodiment of the invention in a processor, processor 100, including logic for forward-pass identification of dead instructions. Processor 100 may be any of a variety of different types of processors, such as a processor in the Pentium® Processor Family, the Itanium® Processor Family, or other processor family from Intel Corporation, or any other general purpose or other processor from another company. Although FIG. 1 illustrates the invention embodied in a processor, the invention may alternatively be embodied in any other type of data processing component or apparatus. In the embodiment of FIG. 1, processor 100 includes register file 110, instruction buffer 120, and dead instruction identifier 130. Register file 110 includes four registers 111 through 114. Dead instruction identifier 130 includes destination table 140 and producer table 150.

Registers 111 through 114 may be any registers or other data storage structure that may serve as a source of data to be used by an instruction executable by processor 100, or a destination of data to be produced by an instruction executable by processor 100. Data may be any type of information, including instructions and instruction identifiers, represented by binary digits or in any other form.

Instruction buffer 120 may be any buffer, file, table, array, or other structure to store instructions. References to instructions in this description may be to any instructions, microinstructions, pseudo-instructions, operations, micro-operations, pseudo-operations, or information in any other form directly or indirectly executable or interpretable by processor 100, or any subset or combination of such instructions or information. Instructions may be stored in instruction buffer 120 in program order, or in any order provided that the program order is otherwise identifiable.

Figure 2:
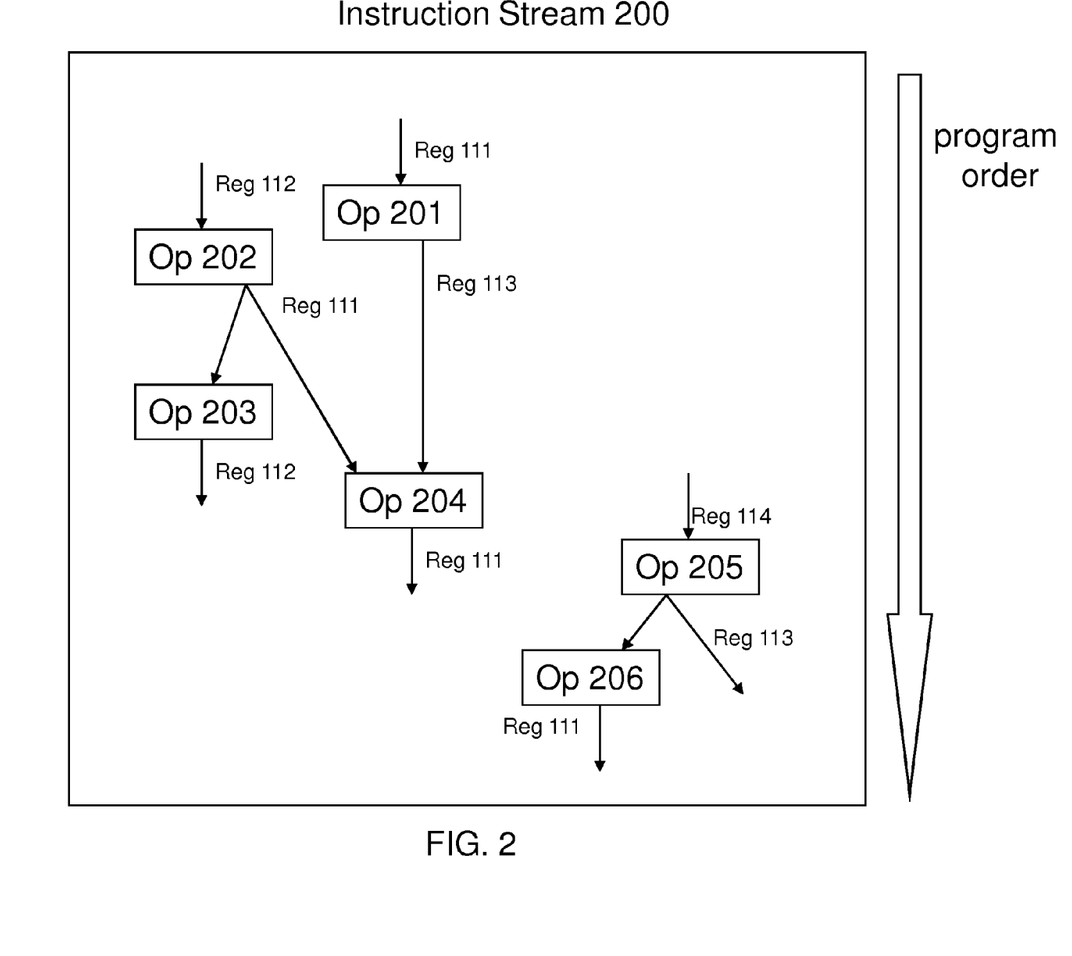
FIG. 2 illustrates an instruction stream that may be optimized according to an embodiment of the present invention.

In the embodiment of FIG. 1, instruction buffer 120 has six entry locations 121 through 126, one for each of the instructions in a stream having six instructions, such as instruction stream 200 represented in FIG. 2. Instruction stream 200 is stored in program order in instruction buffer 120. Instruction 201, the first instruction, is stored in location 121; instruction 202, the second instruction, is stored in location 122, and so on to instruction 206, the last instruction, which is stored in location 126.

Destination table 140 may be any buffer, file, table, array or other structure to store an instruction identifier for each destination at which data may be stored by instructions in an instruction stream. Each destination may be a register in processor 100, such as one of registers 111 to 114, or any other location at which data may be stored. In one embodiment, destination table 140 may be a table known in the art as a register alias table. The instruction identifiers may be any values that identify the instructions in an instruction stream, such as index values that correspond to the entry locations in instruction buffer 120.

In the embodiment of FIG. 1, destination table 140 includes four entry locations 141 through 144, one for each of registers 111 through 114. Each of entries 141 to 144 is to store one of six index values, each corresponding to one of the six entries in instruction buffer 120, such that when a producer writes to a register, the index value corresponding to the producer may be written to the destination table entry corresponding to the register.

Producer table 150 may be any buffer, file, table, array or other structure to track all producers for each consumer in an instruction stream. In the embodiment of FIG. 1, producer table 150 is arranged as a triangular matrix. Each row (except row 160, as described below) of the matrix corresponds to one of the instructions in instruction buffer 120. Row 151 corresponds to instruction 201; row 152 corresponds to instruction 202; and so on to row 156, which corresponds to instruction 206. Each column also corresponds to an instruction, such that each cell in a row is to indicate whether the instruction represented by that column is a direct or indirect producer for the instruction represented by that row. For example, cell 1521 is to indicate whether instruction 201 is a producer for instruction 202.

Producer table 150 may include an additional row, row 160, to store a vector indicating which instructions in the instruction stream are needed for correct program execution, and which instructions are dead instructions. The vector may be computed as described below with reference to FIG. 3G. Row 160 includes one cell for each column of producer table 150.

Each entry location in instruction buffer 120, destination table 140, and producer table 150 may be a register, memory element, or other type of data storage structure. For example, in the embodiment of FIG. 1, each of entry locations 121 to 126 in instruction buffer 120 may be an instruction register, each of entry locations 141 to 144 in destination table 140 may be an index register, and each of entries 1511, 1521 to 1522, 1531 to 1533, 1541 to 1544, 1551 to 1555, and 1561 to 1566 may be any single bit memory element.

FIG. 2 illustrates an instruction stream, instruction stream 200, that may be optimized according to an embodiment of the present invention, for example, by processor 100. Instruction stream 200 includes six instructions or operations, labeled Op 201 to Op 206, shown in program order from the top of FIG. 2 to the bottom of FIG. 2. The source registers and destination register for each instruction are indicated in FIG. 2. For example, register 111 is shown as a source register for instruction 201, because instruction 201 uses data from register 111, and register 113 is shown as the destination register for instruction 201, because instruction 201 writes data to register 113. As is known to one skilled in the art, a single register may be a source or destination register for multiple instructions. For example, register 111 is also a destination register for instruction 204.

FIGS. 3A through 3G illustrate the contents of destination table 140 and producer table 150 after each instruction in instruction stream 200 is processed by processor 100.

Figure 3A:
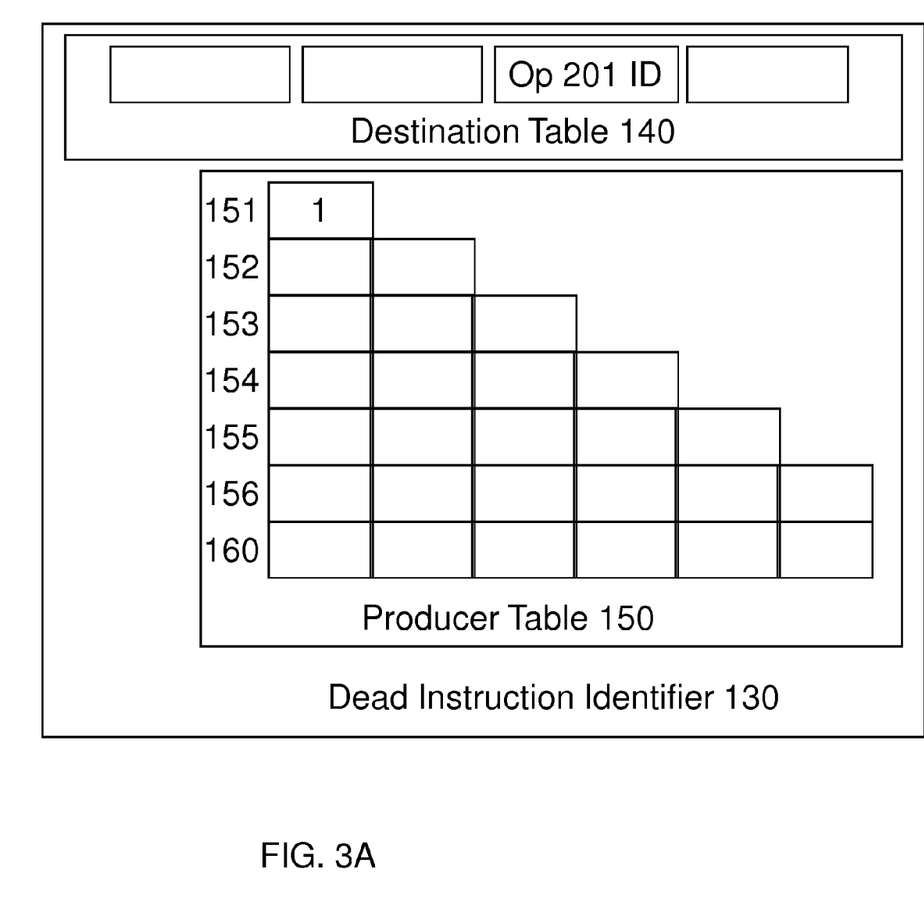
FIGS. 3A through 3G illustrate the contents of a destination table and a producer table after each instruction in an instruction stream is processed.

FIG. 3A shows that cell 1511 is set to a logical '1' after instruction 201 executes so that subsequent consumers of data produced by instruction 201 will see instruction 201 as a producer. Also, FIG. 3A shows that an index value representing instruction 201 is stored in destination table entry 143, because instruction 201 writes to register 103.

Figure 3B:
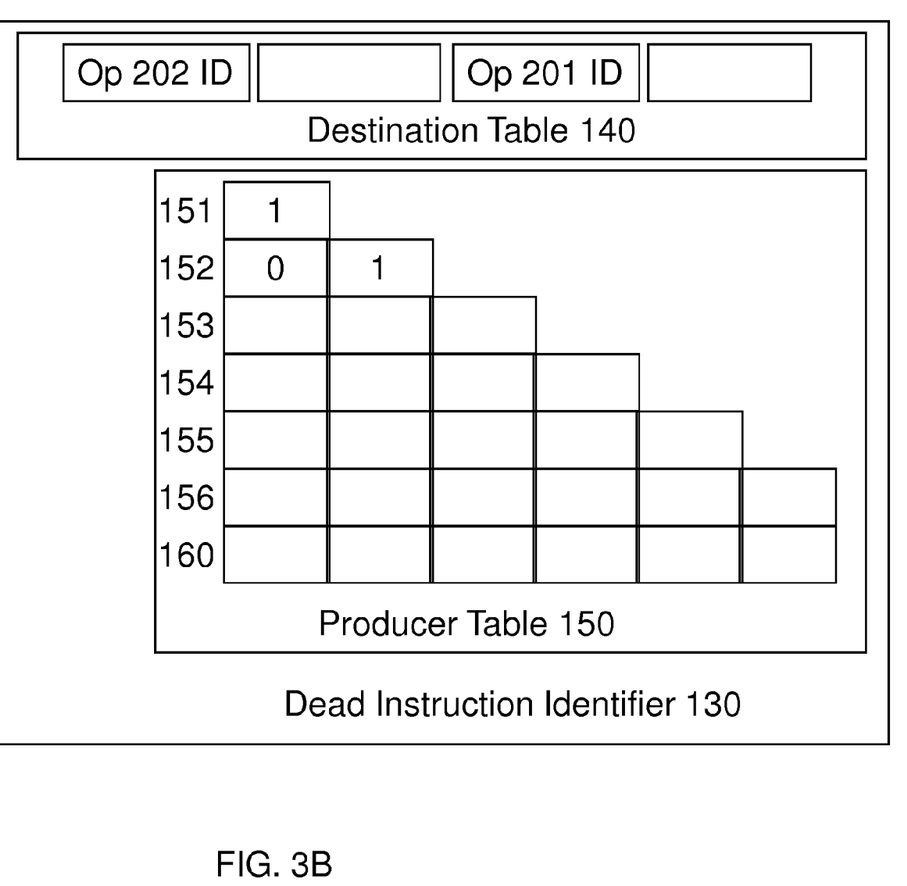

Instruction 202 reads from register 112, so destination table entry 142 is read to see whether register 112 has been written by any producers in stream 200. Since destination table entry 142 is empty, no producers are found for instruction 202. Therefore, FIG. 3B shows that cell 1521 is cleared after instruction 202 executes. Cell 1522 is set so that subsequent consumers of data produced by instruction 202 will see instruction 202 as a producer. Also, FIG. 3B shows that an index value representing instruction 202 is stored in destination table entry 141, because instruction 202 writes to register 111

Figure 3C:
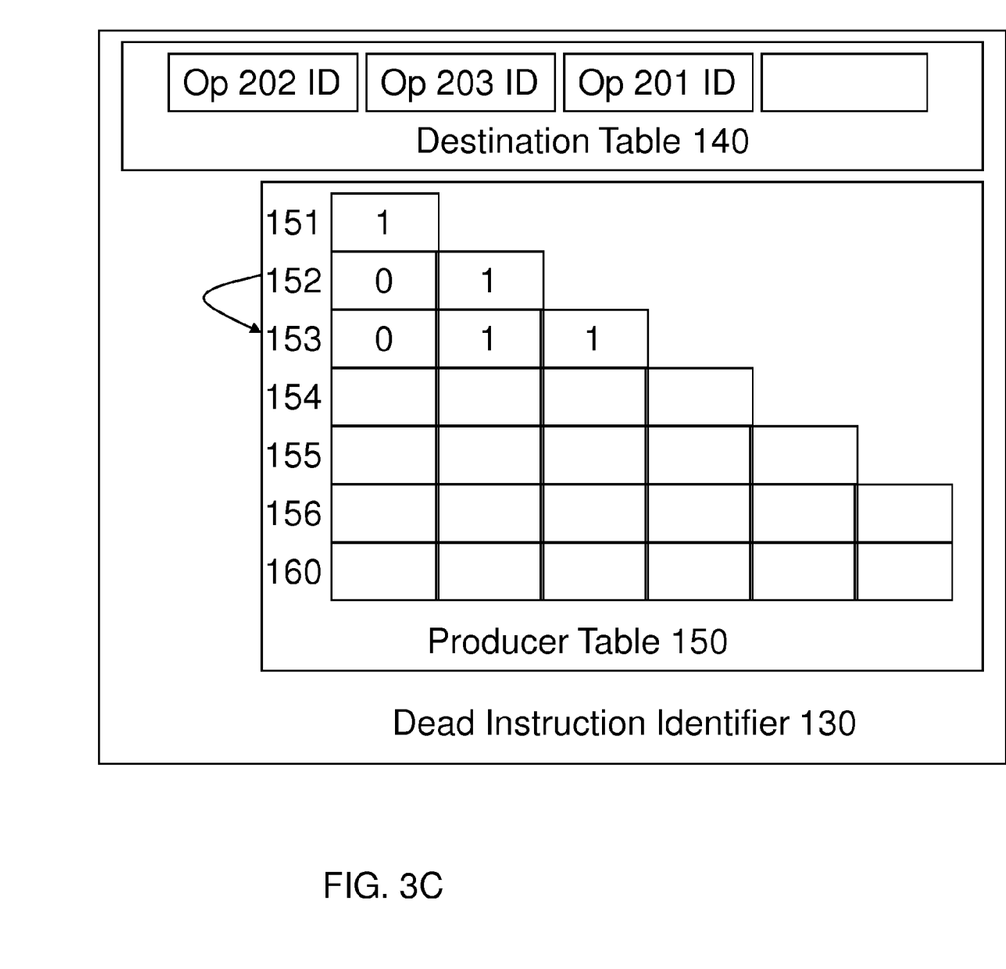

Instruction 203 reads from register 111, so destination table entry 141 is read to see whether register 111 has been written by any producers in stream 200. Since an index value representing instruction 202 is stored in destination table entry 141, instruction 202 is found to be a producer for instruction 203. Therefore, to track all producers, both direct and indirect, for instruction 203 in producer table 150, FIG. 3C shows that, after instruction 203 executes, row 152 is copied to row 153 because instruction 202 is a producer, and cell 1533 is set so that subsequent consumers of data produced by instruction 203 will see instruction 203 as a producer. Also, FIG. 3C shows that an index value representing instruction 203 is stored in destination table entry 142, because instruction 203 writes to register 112.

Figure 3D:
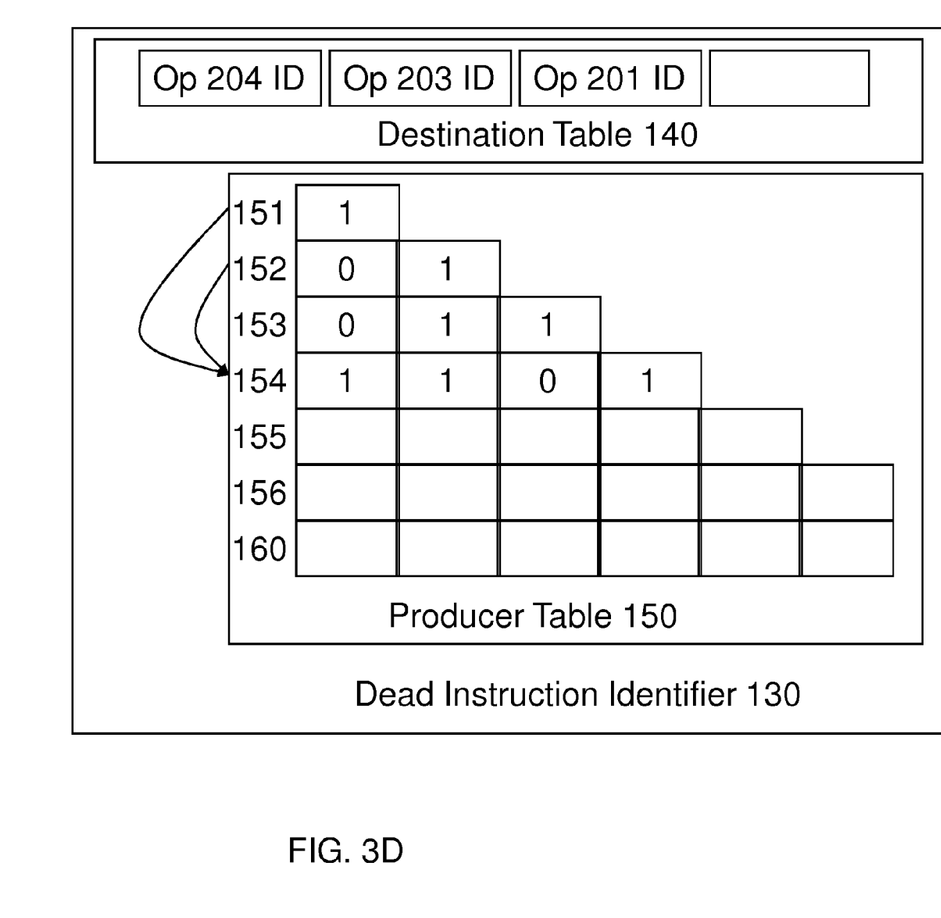

Instruction 204 reads from registers 111 and 113, so destination table entries 141 and 143 are read to see whether registers 111 and 113 have been written by any producers in stream 200. Since index values representing instructions 202 and 201 are stored in destination table entries 141 and 143, respectively, instructions 202 and 201 are found to be producers for instruction 204. Therefore, to track all producers for instruction 204 in producer table 150, FIG. 3D shows that, after instruction 204 executes, rows 151 and 152 are logically ORed and the result is copied to row 154 because instructions 202 and 201 are producers, and cell 1544 is set so that subsequent consumers of data produced by instruction 204 will see instruction 204 as a producer. Also, FIG. 3D shows that an index value representing instruction 204 is stored in destination table entry 141, because instruction 204 writes to register 111.

Figure 3E:
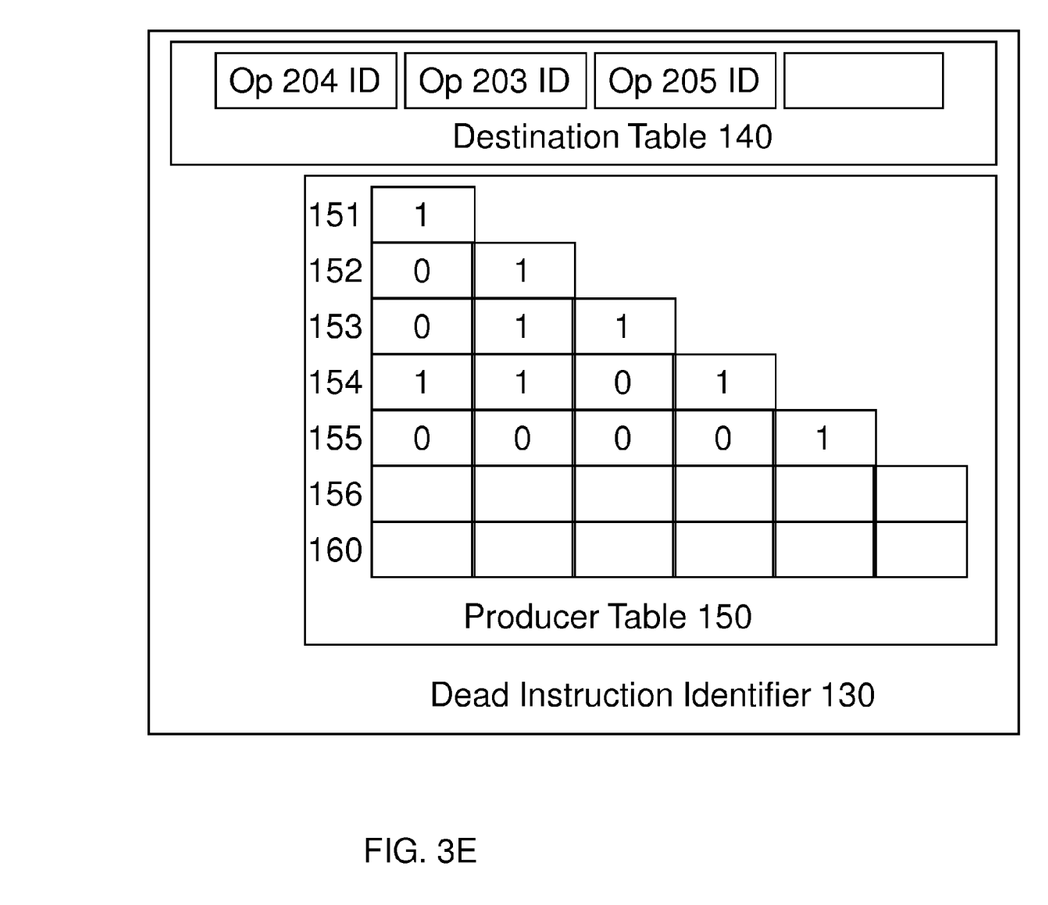

Instruction 205 reads from register 114, so destination table entry 144 is read to see whether register 114 has been written by any producers in stream 200. Since destination table entry 144 is empty, no producers are found for instruction 205. Therefore, FIG. 3E shows that cells 1551 through 1554 are cleared after instruction 202 executes. Cell 1555 is set so that subsequent consumers of data produced by instruction 205 will see instruction 205 as a producer. Also, FIG. 3E shows that an index value representing instruction 205 is stored in destination table entry 143, because instruction 205 writes to register 113.

Figure 3F:
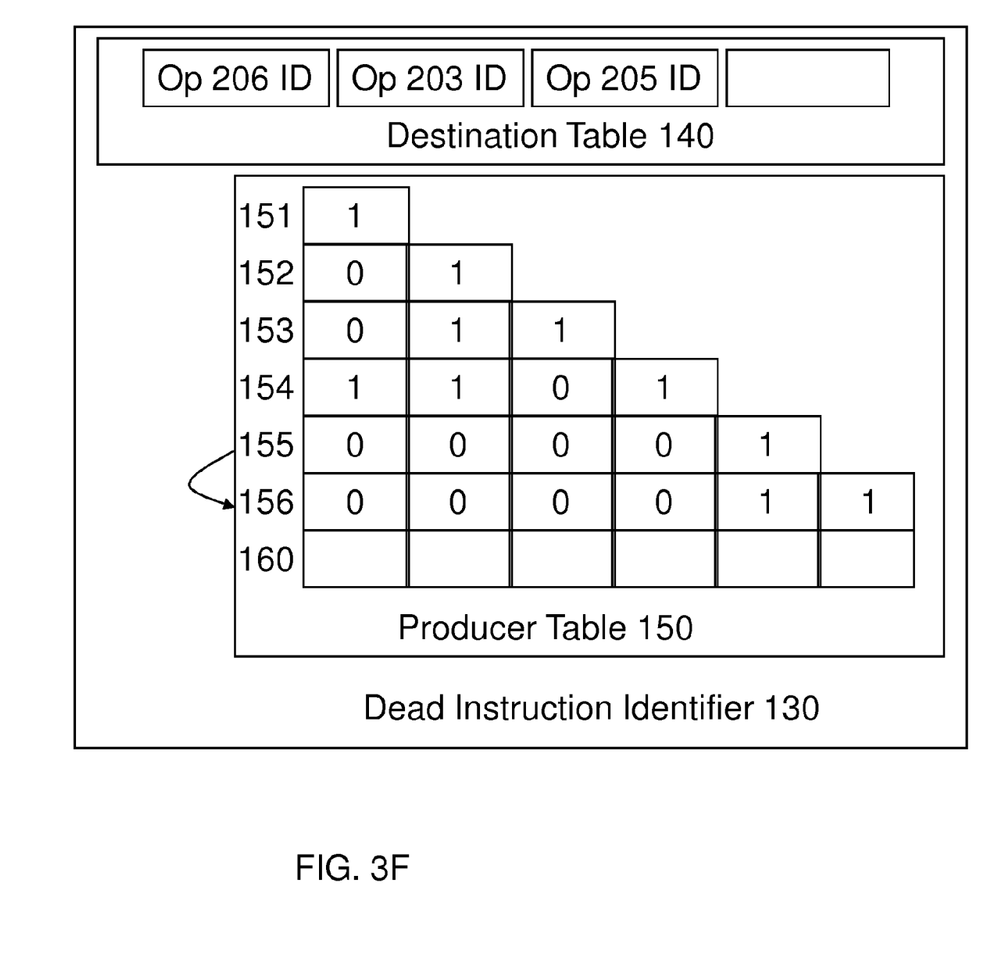

Instruction 206 reads from register 113, so destination table entry 143 is read to see whether register 113 has been written by any producers in stream 200. Since an index value representing instruction 205 is stored in destination table entry 143, instruction 205 is found to be a producer for instruction 206. Therefore, to track all producers for instruction 206 in producer table 150, FIG. 3F shows that, after instruction 206 executes, row 155 is copied to row 156 because instructions 205 is a producer, and cell 1566 is so that subsequent consumers of data produced by instruction 206 will see instruction 206 as a producer. Also, FIG. 3F shows that an index value representing instruction 206 is stored in destination table entry 141, because instruction 206 writes to register 111.

Figure 3G:
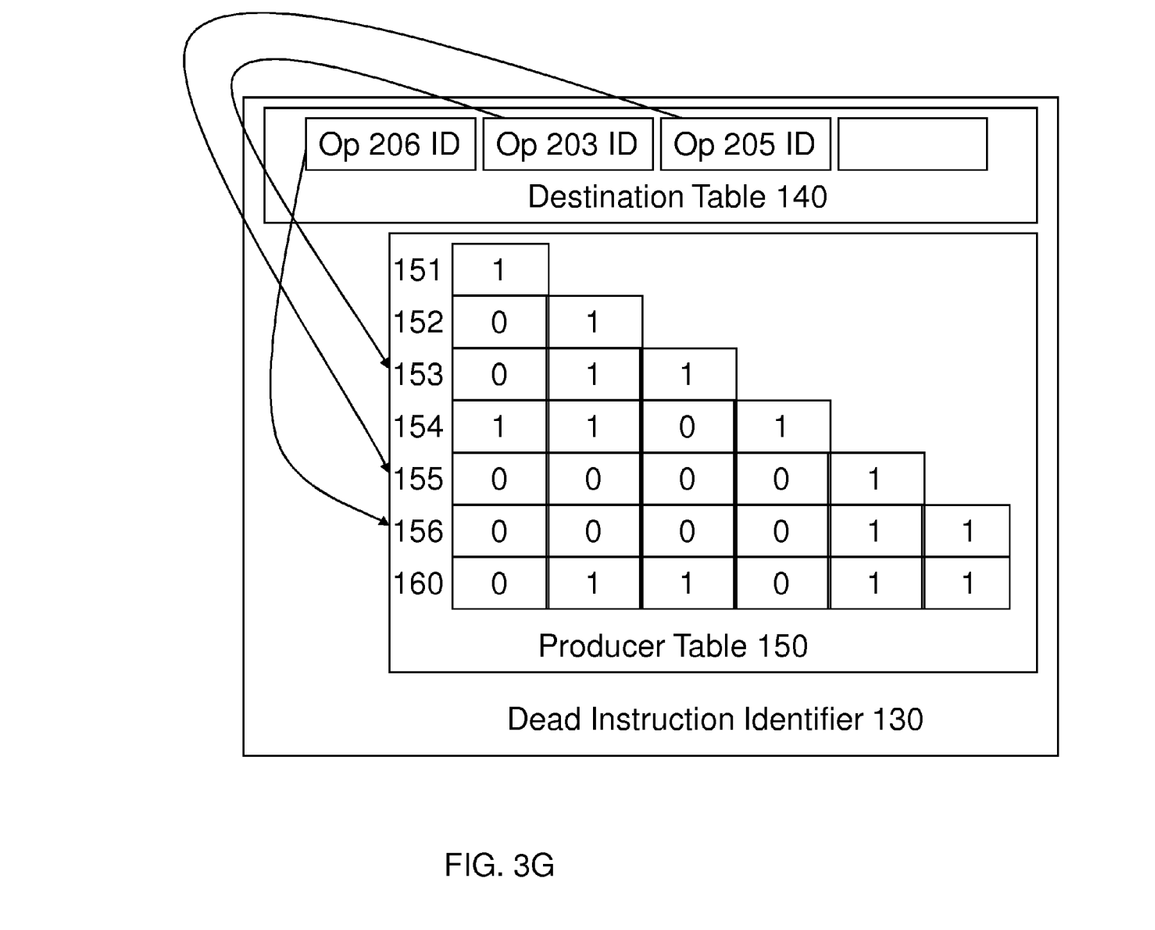

Therefore, after a single forward pass through instruction stream 200, dead instructions may be identified using the contents of destination table 140 and producer table 150, as illustrated in FIG. 3G. Each filled entry location in destination table 140 represents a live-out register. FIG. 3G shows that registers 111, 112, and 113 are live-out registers for instruction stream 200. Each entry in destination table 140 represents a direct producer for a live-out register. FIG. 3G shows that instructions 206, 203, and 205 are direct producers for live-out registers in instruction stream 200. Each direct producer entry is used as an index into producer table 150 to find all indirect producers. The indexed rows are logically ORed to find all direct and indirect producers for all live-out registers. FIG. 3G shows that instructions 202, 203, 205, and 206 represent all direct and indirect producers for all live-out registers in instruction stream 200. All leftover instructions are dead instructions. FIG. 3G shows that instructions 111 and 114 are dead instructions in instruction stream 200.

Figure 4:
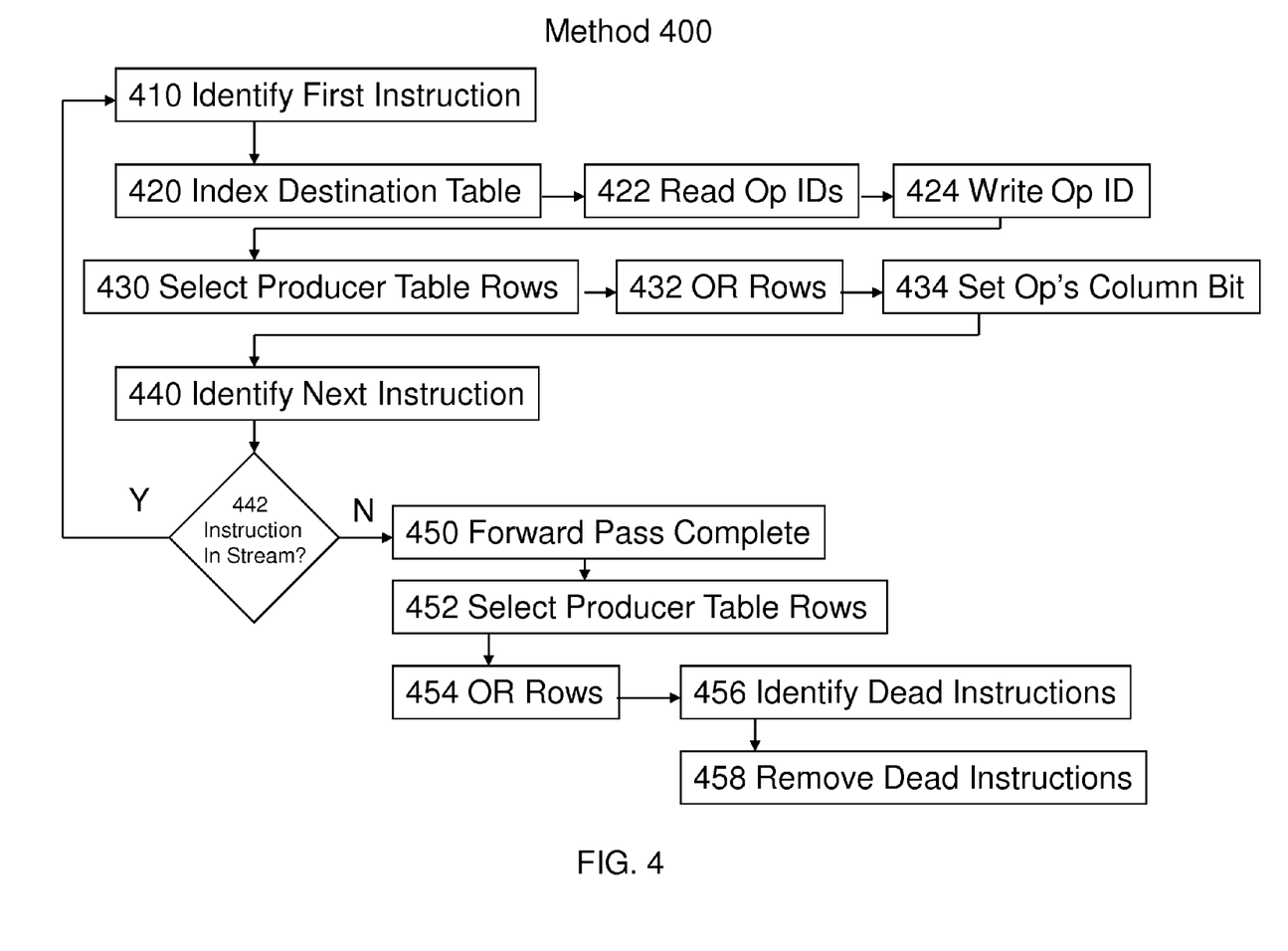
FIG. 4 illustrates an embodiment of the present invention in a method for forward-pass identification of dead instructions.

FIG. 4 illustrates an embodiment of the present invention in a method, method 400, for forward-pass identification of dead instructions. In block 410, a first instruction in an instruction stream is identified, for example, by indexing to the first entry in an instruction buffer that is storing the instruction stream in program order.

In block 420, each logical source identifier for the identified instruction is used to index into a destination table. In block 422, a producer instruction identifier, such as an instruction buffer index value, for each producer, if any, that has written to a logical source for the identified instruction is read from the destination table. In block 424, an instruction identifier, such as the instruction buffer index value, for the identified instruction is written into the destination table entry location corresponding to the logical destination of the identified instruction.

In block 430, the producer instruction identifiers found in block 422 are used to select producer rows for the identified instruction in a producer table. In block 432, the identified producer rows are logically ORed into the row for the identified instruction. In block 434, the bit representing the column for the identified instruction in the row for the identified instruction is set so that future consumers of this instruction will see this instruction as a producer during their ORing operation.

In block 440, the next instruction is identified, for example, by incrementing the index into the instruction buffer. In block 442, the identified instruction is checked to determine if it is inside the instruction stream. If it is, method 400 returns to block 420. If not, in block 450, the forward pass is complete and the destination table contains instruction identifiers for all of the direct producers of data for the live-out registers.

In block 452, the producer table rows identified by the contents of the destination table are selected. In block 454, the selected rows are logically ORed together to find all of the direct and indirect producers. Each bit in the result corresponds to a column in the producer table, and each column corresponds to an instruction. The columns with a result bit set represent instructions in the instruction stream that are direct or indirect producers of data for live-out registers. The columns with a cleared result bit represent dead instructions. In block 456, the dead instructions are identified. In block 458, the dead instructions are removed from the instruction stream, for example by copying the direct and indirect producers, but not the dead instructions, into an instruction cache.

Within the scope of the present invention, method 400 may be performed in a different order, with illustrated block performed simultaneously, with illustrated blocks omitted, with additional blocks added, or with a combination of reordered, combined, omitted, or additional blocks. Furthermore, the method may be performed by hardware, software, firmware, or any combination of hardware, software, and firmware. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, an expression, a compiler, etc. The term firmware generally refers to a logical structure, a method, a procedure, a program, a routine, a process, an algorithm, a formula, or expression that is implemented or embodied in a hardware structure (e.g., flash memory or read only memory). Examples of firmware are microcode, writable control store, and micro-programmed structure.

Figure 5:
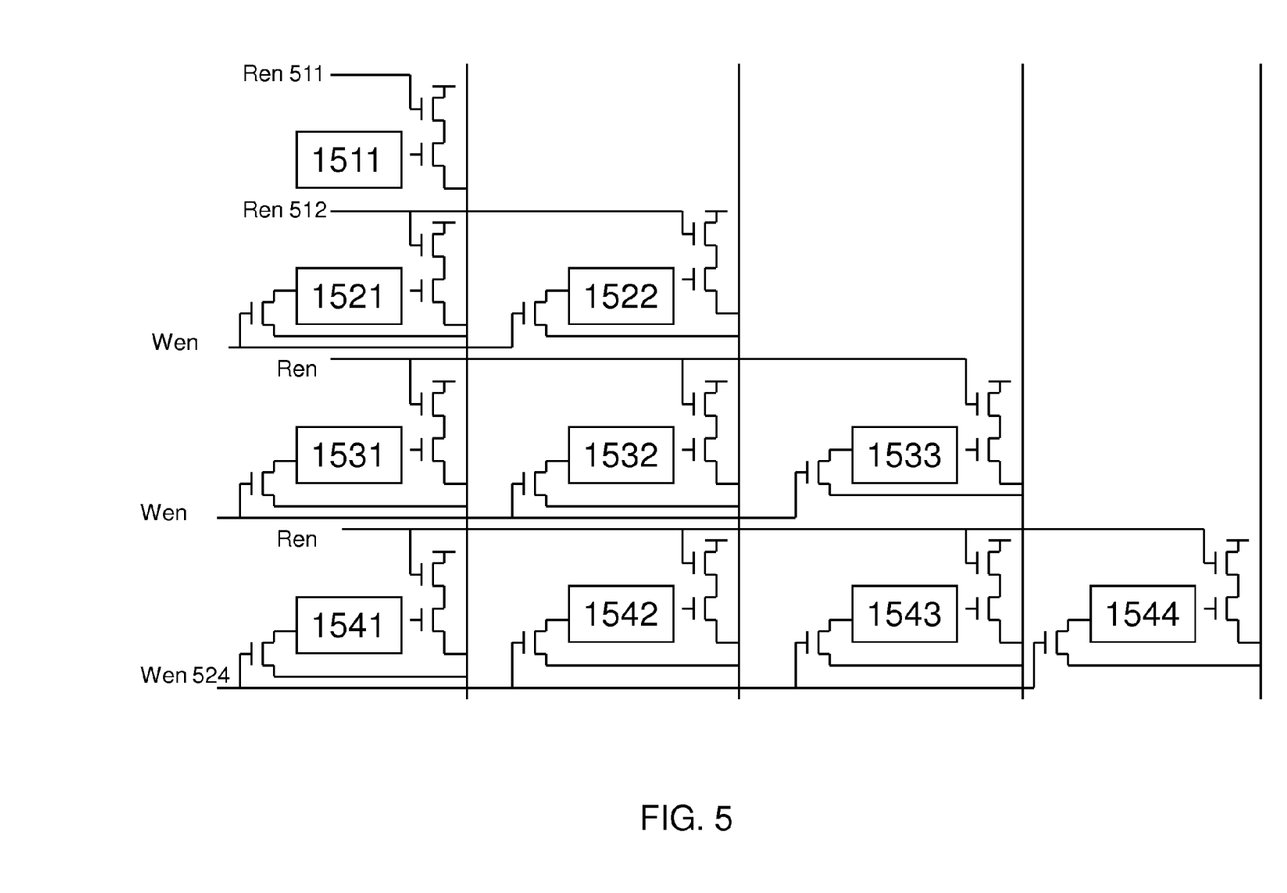
FIG. 5 illustrates an embodiment of a portion of a producer table implemented with wired OR logic.

Any type of logic or circuitry may be used in hardware implementations. FIG. 5 illustrates an embodiment of a portion of producer table 150 implemented with wired OR logic. In FIG. 5, the output of each producer table cell gates a pull-up transistor to a column or bit line. Each of these pull-up transistors is connected in series to a read-enable pull-up transistor, so that a bit line may be pulled up by any read-enabled cell in its column that is set. In each row, the read-enable signals are connected. Therefore, when an instruction identifier is stored in an entry in the destination table that corresponds to a source register, a read-enable signal for the row in the producer table that represents that instruction may be activated to read all of the cells in that row simultaneously. Similarly, in each row, the write-enable signals are connected, so that a single write-enable signal may be activated to enable a consumer row to store a copy of the contents of one or more (the logically ORed contents) read-enabled producer rows.

For example, referring to FIG. 5, assume that instruction 201 is a producer of data for one logical source register for instruction 204, and instruction 202 is a producer of data for another logical source register for instruction 204. Therefore, a producer table read-enable vector indicating which instruction identifiers are stored in the destination table may be generated by reading the destination table, and will include a set bit for instruction 201, such that read-enable signal 511 will be activated, and a set bit for instruction 202, such that read-enable signal 512 will be activated. Write-enable signal 524 will also be activated to copy to the wired-OR result to row 154, which represents instruction 204, the consumer in this example.

One of skill in the art will recognize that FIG. 5 represents only a portion of an implementation of a producer table. For example, FIG. 5 does not show the logic necessary to set the cells in each row where the row intersects with the column that represents the same instruction as the row (as in block 434 of FIG. 4), or the logic necessary to clear cells. These portions and any other portions of a producer table not shown in FIG. 5 may be implemented according to any known approach.

Processor 100, or any other processor or component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, techniques for forward-pass dead instruction identification are disclosed. While certain embodiments have been described, and shown in the accompanying drawings, it is to be understood that such embodiments are merely illustrative of and not restrictive on the broad invention, and that this invention not be limited to the specific constructions: and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
    an instruction buffer to store an instruction stream having a single entry point and a single exit point, the instruction buffer including a plurality of instruction buffer entry locations; and
    a dead instruction identifier to identify dead instructions in the instruction stream based on a forward pass through the instruction stream, the dead instruction identifier including a destination table to store, for each destination at which data is to be stored in the instruction stream, one of a plurality of index values, each of the plurality of index values corresponding to exactly one of the plurality of instruction buffer entry locations, to identify which instruction in the instruction stream is to produce the data to be stored at the destination, the dead instruction identifier also including a producer table to track, for each consumer instruction in the instruction stream, all instructions that are to produce data to be used by the consumer instruction, by storing indicators to indicate whether each other instruction in the producer table produces data for the consumer instruction, the storing indicators including storing the result of a logical OR operation using indicators stored for at least two of the other instructions in the producer table that produce data for the consumer instruction.

2. The apparatus of claim 1, further comprising a plurality of data storage structures, wherein the destination table includes a plurality of destination entry locations, one for each of the data storage structures.

3. The apparatus of claim 1, wherein the producer table includes a plurality of rows and a plurality of columns wherein each pair of a row and a column corresponds to an instruction in the instruction stream.

4. The apparatus of claim 3, wherein each of the plurality of rows includes:
    read enable logic to activate rows corresponding to producer instructions; and
    write enable logic to activate a row corresponding to a consumer instruction.

5. The apparatus of claim 4, wherein each of the plurality of columns includes a bit line to indicate whether one or more of the activated rows is storing a bit to indicate that at least one of the instructions represented by the one or more activated rows is a consumer of the instruction represented by the column of the plurality of columns.

6. A method comprising:
    storing an instruction stream in an instruction buffer having a plurality of instruction buffer entry locations;
    determining, during a forward pass through the instruction stream, which instructions in the instruction stream produce data for each of a plurality of destinations, including storing one of a plurality of index values, each of the plurality of index values corresponding to exactly one of the plurality of instruction buffer entry locations, to identify which instruction in the instruction stream produces data for a destination in a destination entry location for that destination, and also including, for a consumer instruction, storing indicators to indicate whether each other instruction in the producer table produces data for the consumer instruction, the storing indicators including storing the result of a logical OR operation using indicators stored for at least two of the other instructions in the producer table that produce data for the consumer instruction; and
    identifying, based on the determination, dead instructions.

7. The method of claim 6, wherein determining also includes reading an instruction identifier for a first instruction that produces data for a destination from the destination entry location for that destination, where the destination is a source of data for a second instruction.

8. The method of claim 7, wherein determining also includes using the instruction identifier to determine which instructions produce data for the second instruction.

9. The method of claim 6, wherein identifying includes reading indicators for each instruction that last produces data for a destination, wherein each indicator indicates whether each other instruction in the producer table produces data for each instruction that last produces data for a destination.

10. The method of claim 6, further comprising removing the dead instructions from the instruction stream.

11. The method of claim 10, wherein removing the dead instructions includes storing the instruction stream without the dead instructions in an instruction cache.

12. A system comprising:
- a dynamic random access memory; and
- a processor coupled to the memory, including:
    - an instruction buffer to store an instruction stream having a single entry point and a single exit point, the instruction buffer including a plurality of instruction buffer entry locations; and
    - a dead instruction identifier to identify dead instructions in the instruction stream based on a forward pass through the instruction stream, the dead instruction identifier including a destination table to store, for each destination at which data is to be stored in the instruction stream, one of a plurality of index values, each of the plurality of index values corresponding to exactly one of the plurality of instruction buffer entry locations, to identify which instruction in the instruction stream is to produce the data to be stored at the destination, the dead instruction identifier also including a producer table to track, for each consumer instruction in the instruction stream, all instructions that are to produce data to be used by the consumer instruction, by storing indicators to indicate whether each other instruction in the producer table produces data for the consumer instruction, the storing indicators including storing the result of a logical OR operation using indicators stored for at least two of the other instructions in the producer table that produce data for the consumer instruction.

* * * * *